(12) United States Patent
Ouyang et al.

(10) Patent No.: US 10,108,367 B2
(45) Date of Patent: *Oct. 23, 2018

(54) METHOD FOR A SOURCE STORAGE DEVICE SENDING DATA TO A BACKUP STORAGE DEVICE FOR STORAGE, AND STORAGE DEVICE

(71) Applicant: HUAWEI TECHNOLOGIES CO., LTD., Shenzhen, Guangdong (CN)

(72) Inventors: Ji Ouyang, Chengdu (CN); Ye Zou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

This patent is subject to a terminal disclaimer.

(21) Appl. No.: 15/064,890

(22) Filed: Mar. 9, 2016

(65) Prior Publication Data

US 2016/0188240 A1 Jun. 30, 2016

Related U.S. Application Data

(63) Continuation of application No. 14/582,556, filed on Dec. 24, 2014, now Pat. No. 9,311,191, which is a
(Continued)

(30) Foreign Application Priority Data

Jul. 26, 2013 (WO) ................ PCT/CN2013/080203

(51) Int. Cl.
*G06F 11/00* (2006.01)
*G06F 3/06* (2006.01)
(Continued)

(52) U.S. Cl.
CPC .......... *G06F 3/065* (2013.01); *G06F 11/1451* (2013.01); *G06F 11/1464* (2013.01);
(Continued)

(58) Field of Classification Search
CPC ............. G06F 11/1451; G06F 11/1464; G06F 11/2094; G06F 11/2097; G06F 2201/82;
(Continued)

(56) References Cited

U.S. PATENT DOCUMENTS 5,758,359 A 5/1998 Saxon
6,526,418 B1 2/2003 Midgley
(Continued)

FOREIGN PATENT DOCUMENTS

CN 1704903 A 12/2005
CN 101126998 A 2/2008
(Continued)

OTHER PUBLICATIONS

Lou Ying et al. A Block-Level Multi-Mode Data Disaster—Tolerance Model, Microelectronics & Computer; vol. 24; No. 10; Jun. 8, 2007, total 3 pages.
(Continued)

*Primary Examiner* — Marc Duncan
(74) *Attorney, Agent, or Firm* — Huawei Technologies Co., Ltd.

(57) ABSTRACT

In a backup method, a source storage device sends data to a backup storage device. The source storage device contains a processor and a cache. The processor receives a write data request which includes target data. And then, the processor reads a period ID recorded in a period ID table, wherein the period ID is corresponding to a first period. Next, the processor modifies the write data request by attaching the period ID to the target data and writes the modified write data request into the cache. After a backup task corresponding to the period is triggered, the processor obtains data received during the period corresponding to the period ID and sends the obtained data to the backup storage device.

6 Claims, 9 Drawing Sheets

Related U.S. Application Data continuation of application No. PCT/CN2013/087229, filed on Nov. 15, 2013.

(51) Int. Cl.
*G06F 11/14* (2006.01)
*G06F 11/20* (2006.01)
*G06F 12/0866* (2016.01)

(52) U.S. Cl.
CPC ...... *G06F 11/2094* (2013.01); *G06F 11/2097* (2013.01); *G06F 12/0866* (2013.01); *G06F 2201/82* (2013.01); *G06F 2201/84* (2013.01); *G06F 2201/885* (2013.01); *G06F 2212/1032* (2013.01); *G06F 2212/466* (2013.01)

(58) Field of Classification Search
CPC . G06F 2201/84; G06F 2201/885; G06F 3/065
See application file for complete search history.

(56) References Cited

U.S. PATENT DOCUMENTS

| | | | |
|---|---|---|---|
| 6,675,177 B1 | 1/2004 | Webb | |
| 7,885,923 B1* | 2/2011 | Tawri | G06F 11/2064 707/610 |
| 8,005,795 B2 | 8/2011 | Galipeau et al. | |
| 8,073,922 B2 | 12/2011 | Bates | |
| 8,127,174 B1 | 2/2012 | Shah et al. | |
| 8,140,772 B1 | 3/2012 | Yang et al. | |
| 8,145,865 B1* | 3/2012 | Longinov | G06F 11/2066 711/165 |
| 8,150,805 B1 | 4/2012 | Tawri et al. | |
| 8,806,281 B1 | 8/2014 | Dowers, II et al. | |
| 8,924,665 B2* | 12/2014 | Longinov | G06F 11/2064 711/103 |
| 9,311,016 B2* | 4/2016 | Ezra | G06F 3/0614 |
| 9,311,191 B2* | 4/2016 | Ouyang | G06F 3/06 |
| 2003/0078903 A1 | 4/2003 | Kimura et al. | |
| 2003/0217080 A1 | 11/2003 | White et al. | |
| 2004/0230624 A1 | 11/2004 | Frolund et al. | |
| 2005/0235121 A1 | 10/2005 | Ito et al. | |
| 2006/0248125 A1 | 11/2006 | Kawamura | |
| 2007/0050573 A1 | 3/2007 | Arakawa et al. | |
| 2007/0192544 A1 | 8/2007 | Frolund et al. | |
| 2007/0294568 A1 | 12/2007 | Kanda et al. | |
| 2008/0028009 A1 | 1/2008 | Ngo | |
| 2008/0089294 A1 | 4/2008 | Shon et al. | |
| 2008/0228834 A1 | 9/2008 | Burchall et al. | |
| 2010/0054444 A1 | 3/2010 | Brunson | |
| 2010/0199042 A1 | 8/2010 | Bates et al. | |
| 2011/0295812 A1 | 12/2011 | Galipeau et al. | |
| 2012/0079207 A1 | 3/2012 | Yochai et al. | |
| 2012/0079222 A1 | 3/2012 | Phelps et al. | |
| 2012/0151273 A1 | 6/2012 | Ben Or et al. | |
| 2012/0243395 A1 | 9/2012 | Farey | |
| 2012/0304006 A1 | 11/2012 | Kawaguchi | |
| 2013/0339569 A1 | 12/2013 | Yochai et al. | |
| 2014/0089264 A1* | 3/2014 | Talagala | G06F 11/1471 707/649 |
| 2014/0181029 A1 | 6/2014 | Erofeev | |
| 2016/0088081 A1* | 3/2016 | Burr | G06F 11/2064 709/219 |

FOREIGN PATENT DOCUMENTS

| | | |
|---|---|---|
| CN | 101634968 A | 1/2010 |
| CN | 101751230 A | 6/2010 |
| CN | 101901173 A | 12/2010 |
| CN | 102177508 A | 9/2011 |
| CN | 102306115 A | 1/2012 |
| CN | 103092526 A | 5/2013 |
| EP | 0672985 A1 | 2/1995 |
| EP | 0672985 A1 | 9/1995 |
| EP | 0983548 B1 | 10/2005 |
| EP | 1624376 A2 | 2/2006 |
| EP | 2336901 A2 | 6/2011 |
| EP | 2426605 A1 | 3/2012 |
| JP | 07244597 A | 9/1995 |
| JP | 2005128861 A | 5/2005 |
| JP | 2006099495 A | 4/2006 |
| JP | 2007066154 A | 3/2007 |
| JP | 2012003621 A | 1/2012 |
| RU | 2383952 C2 | 3/2010 |

OTHER PUBLICATIONS

Liu Zhenjun et al. Backup and Recovery of Shared Storage System, Computer Engineering, vol. 33 No. 10, May 2007, total 3 pages.

Yi Guwu et al. Data consistency checking method in network backup system, App lication Research of Computers, vol. 25 No. 12, Dec. 2008. total 3 pages.

Naoya Takahashi, "An Improved Inter-Disk Remote Copying Method to Cope with Disasters", Technical Report of the Institute of Electronics, Information, and Communication Engineers (J87-D-I) No. 6, Japan, Institute of Electronics, Information, and Communication Engineers, Jun. 1, 2004, vol. J87-D-I, pp. 675-692, total 19 pages.

EMC® Symmetrix® Remote Data Facility (SRDF®), Product Guide, Mar. 2014, total 178 pages.

Naoya Takahashi, "An Improved Inter-Disk Remote Copying Method to Cope with Disasters", Technical Report of the Institute of Electronics, Information, and Communication Engineers (J87-D-I) No. 6, Japan, Institute of Electronics, Information, and Communication Engineers, Jun. 1, 2004, vol. J87-D-I, pp. 675-692. English Translation.

\* cited by examiner

METHOD FOR A SOURCE STORAGE DEVICE SENDING DATA TO A BACKUP STORAGE DEVICE FOR STORAGE, AND STORAGE DEVICE

CROSS-REFERENCE TO RELATED APPLICATIONS

This application is a continuation of U.S. patent application Ser. No. 14/582,556, filed on Dec. 24, 2014, which is a continuation of International Application No. PCT/CN2013/087229, filed on Nov. 15, 2013, which claims priority to International Application NO. PCT/CN2013/080203, filed on 26 Jul. 2013. The afore-mentioned patent applications are hereby incorporated by reference in their entireties.

TECHNICAL FIELD

The present invention relates to storage technologies, and in particular, to a method for a source storage device sending data to a backup storage device and a storage device.

BACKGROUND

Data disaster recovery, also known as remote data replication technologies, refers to setup of a non-local data system which is an available replication of local data. When a disaster occurs in local data or an entire application system, at least one available copy of essential service data of the system is stored non-locally.

A typical data disaster recovery system includes a production center and a disaster recovery center. In the production center, hosts and a storage array are deployed for normal operation of services; and in the disaster recovery center, hosts and a storage array are deployed to take over services of the production center after the production center encounters a disaster. The storage array of either the production center or the disaster recovery center includes multiple data volumes and a data volume is logical storage space formed by mapping physical storage space. After data generated by services in the production center is written to the production array, the data can be replicated to the disaster recovery center by using a disaster recovery link and written to the disaster recovery array. In order that the data in the disaster recovery center can support takeover of services after occurrence of a disaster, consistency of the data replicated to the disaster recovery array must guaranteed. Guarantee of data consistency in nature is dependency-based write data requests, where the dependency needs to be guaranteed. Application programs, operating systems, and databases all inherently rely on logic of this dependency of write data requests to run their services. For example, write data request 2 is not executed until write data request 1 is complete. The order is fixed. That is to say, the system will not deliver write data request 2 until it is ensured that write data request 1 is returned successfully and completely. In this way, services can be restored by relying on an inherent method when an execution process is interrupted because of a failure. Otherwise, it is possible that, for example, when data is read, data stored by write data request 2 can be read while data stored by write data request 1 cannot be read, and as a result, services cannot be restored.

In the prior art, a snapshot technology is used to solve the problem. A snapshot is an image of data at a time point (time point when copying is started). The purpose of a snapshot is to create a state view for a data volume at a specific time point. From this view, only data of the data volume at the time of creation can be viewed while modifications (new data is written) to the data volume after the time point will not be reflected in the snapshot view. By using this snapshot view, replication of data can be implemented. For the production center, snapshot data is "static". Therefore, the production center can replicate snapshot data to the disaster recovery center after a data snapshot is taken at each time point. This not only implements remote data replication but will not impact execution of a subsequent write data request in the production center. For the disaster recovery center, the requirement of data consistency may also be satisfied. For example, when data of write data request 2 is replicated to the disaster recovery center successfully while data of write data request 1 is not replicated successfully, snapshot data before write data request 2 can be used to restore the data in the disaster recovery center to a previous state.

Because the production center needs to process a snapshot when executing a write data request, and store the generated snapshot data in a data volume dedicated for storage of snapshot data, when the production center replicates the snapshot data to the disaster recovery center, it is necessary to read the snapshot data stored in the data volume to a cache and then send the snapshot data to the disaster recovery center. The data used to generate the snapshot data, however, possibly still exists in the cache but cannot be utilized properly. Every replication requires reading snapshot data from the data volume, which results in long data replication and low efficiency.

SUMMARY

An embodiment of the present invention provides a method for a source storage device sending data to a backup storage device and a storage device where information carried in a write data request can be sent to a second storage device directly from a cache of a first storage device, which increases efficiency of data replication.

In a first aspect, an embodiment of the present invention provides a method for a source storage device sending data to a target storage device for storage, where the source storage device includes a processor and a cache, including:

receiving, by a first storage device, a first write data request sent by a host, where the first write data request carries data to be written and address information;

adding a first number to the data to be written and the address information, and writing the data to be written and the address information that are added the first number, where the first number is a current time period number;

reading the data to be written and the address information corresponding to the first number from the cache;

modifying the current time period number to identify information carried in a subsequent write data request; and sending the data to be written and the address information to a second storage device.

In a first possible implementation of the first aspect of the embodiment of the present invention, the first number is used to identify a current replication task and the method further includes:

recording a second number, where the second number is a number corresponding to a latest completed replication task before the current replication task.

With reference to the first possible implementation of the first aspect of the embodiment of the present invention, in a second possible implementation of the first aspect, the method further includes:

reading, from the cache, data to be written and the address information corresponding to a number following the second number and preceding the first number; and sending the data to be written and the address information corresponding to the number following the second number and preceding the first number to the second storage device.

In a third possible implementation of the first aspect of the embodiment of the present invention, the method further includes: recording the current time period number, where the current time period number is used to generate the first number.

In a second aspect, an embodiment of the present invention provides method for a target storage device receiving data from a source storage device of a storage system for storage, wherein the target storage device includes a processor and a cache, including:

receiving, by a second storage device, address information sent by a first storage device;

when it is determined that the first storage device has failed, obtaining, by the second storage device according to the address information, data to be written corresponding to a first number, where address information corresponding to the first number is the same as the received address information and the first number is a number preceding a current time period number; and adding a second number to the data to be written and the address information corresponding to the first number and writing the information to a cache.

In a first possible implementation of the second aspect of the embodiment of the present invention, the method further includes: recording the current time period number, where the current time period number is used to generate the second number.

In a second possible implementation of the second aspect of the embodiment of the present invention, the method further includes:

receiving a read data request sent by a host, where the read data request includes the received address information;

determining that a latest number corresponding to the received address information is the second number; and sending data to be written corresponding to the second number to the host.

In a third aspect, an embodiment of the present invention provides a storage device, including:

a receiving module, configured to receive a first write data request sent by a host, where the first write data request carries data to be written and the address information;

a reading and writing module, configured to add a first number to the data to be written and address information and write the data to be written and the address information that are added the first number to a cache, where the first number is a current time period number; and read the data to be written and the address information corresponding to the first number from the cache;

a current time period number manager, configured to modify the current time period number to identify information carried in a subsequent write data request; and a sending module, configured to send the data to be written and the address information to a second storage device.

In a first possible implementation of the third aspect of the embodiment of the present invention, the first number is used to identify a current replication task; and the current time period number manager is further configured to record a second number, where the second number is a number corresponding to a latest completed replication task before the current replication task.

With reference to the first possible implementation of the third aspect of the embodiment of the present invention, in a second possible implementation of the third aspect, the reading and writing module is further configured to read, from the cache, data to be written and the address information corresponding to a number following the second number and preceding the first number; and the sending module is further configured to send the data to be written and address information corresponding to the number following the second number and preceding the first number to the second storage device.

In a third implementation of the third aspect of the embodiment of the present invention, the current time period number manager is further configured to record the current time period number, where the current time period number is used to generate the first number.

In a fourth aspect, an embodiment of the present invention provides a storage device, including:

a receiving module, configured to receive address information sent by a first storage device;

a searching module, configured for: when it is determined that the first storage device has failed, obtain, according to the address information, data to be written corresponding to a first number, where address information corresponding to the first number is the same as the received address information and the first number is a number preceding a current time period number; and a writing module, configured to add a second number to the data to be written and the address information corresponding to the first number and write the information to a cache.

In a first possible implementation of the fourth aspect of the embodiment of the present invention, the storage device further includes:

a current time period number manager, configured to record the current time period number, where the current time period number is used to generate the second number.

In a second possible implementation of the fourth aspect of the embodiment of the present invention, the receiving module is further configured to receive a read data request sent by a host, where the read data request includes the received address information;

the searching module is further configured to determine that a latest number corresponding to the received address information is the second number; and the storage device further includes a sending module, where the sending module is configured to send data to be written corresponding to the second number to the host.

In a fifth aspect, an embodiment of the present invention provides a storage device, including a processor, a memory, and a communications bus, where, the processor and the memory communicate by using the communications bus;

the memory is configured to store a program; and the processor is configured to execute the program to implement:

receiving a first write data request sent by a host, where the first write data request carries data to be written and the address information; adding a first number to the data to be written and address information, and writing the data to be written and the address information that are added the first number to a cache, where the first number is a current time period number; reading the data to be written and the address information corresponding to the first number from the cache; modifying the current time period number to identify information carried in a subsequent write data request; and sending the data to be written and the address information to a second storage device.

In a first possible implementation of the fifth aspect of the embodiment of the present invention, the first number is used to identify a current replication task and the processor is further configured to:

record a second number, where the second number is a number corresponding to a latest completed replication task before the current replication task.

With reference to the first possible implementation of the fifth aspect of the embodiment of the present invention, in a second possible implementation of the fifth aspect, the processor is further configured to read, from the cache, data to be written and the address information corresponding to a number following the second number and preceding the first number, and send the data to be written and the address information corresponding to the number following the second number and preceding the first number to the second storage device.

In a third possible implementation of the fifth aspect of the embodiment of the present invention, the processor is further configured to record the current time period number, where the current time period number is used to generate the first number.

In a sixth aspect, an embodiment of the present invention provides a storage device, including a processor, a memory, and a communications bus, where, the processor and the memory communicate by using the communications bus;

the memory is configured to store a program; and the processor is configured to execute the program to implement:

receiving address information sent by a first storage device;

when it is determined that the first storage device has failed, obtaining, by a second storage device according to the address information, data to be written corresponding to a first number, where address information corresponding to the first number is the same as the received address information and the first number is a number preceding a current time period number; and adding a second number to the data to be written and the address information corresponding to the first number and writing the information to a cache.

In a first possible implementation of the sixth aspect of the embodiment of the present invention, the processor is further configured to record the current time period number, where the current time period number is used to generate the second number.

In a second possible implementation of the sixth aspect of the embodiment of the present invention, the processor is further configured to receive a read data request sent by a host, where the read data request includes the received address information; determine that a latest number corresponding to the received address information is the second number; and send data to be written corresponding to the second number to the host.

In the embodiments of the present invention, after a first storage device receives a write data request sent by a host, where information carried in the write data request includes data to be written and address information, the first storage device adds a first number to the data to be written and address information and writes the information to the cache, where the first number is a current time period number. When a replication task is triggered, the first storage device reads the data to be written and address information corresponding to the first number from the cache and sends the information to the second storage device. In addition, when a replication task is triggered, the first storage device modifies the current time period number, so that the first storage device, when receiving a write data request subsequently, adds the same number as the modified current time period number to information carried in the write data request. Thereby, in the cache, information carried in a write data request to be sent to the second storage device is distinguished from information carried in a write data request being received by the first storage device. This implements direct sending of information carried in a write data request from the cache to the second storage device. Because information is sent directly from the cache without the need to read it from a data volume, the data replication time is short, which increases efficiency of data replication.

BRIEF DESCRIPTION OF DRAWINGS

To illustrate the technical solutions in the embodiments of the present invention more clearly, the following briefly introduces the accompanying drawings required for describing the embodiments.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention.

Figure 1:
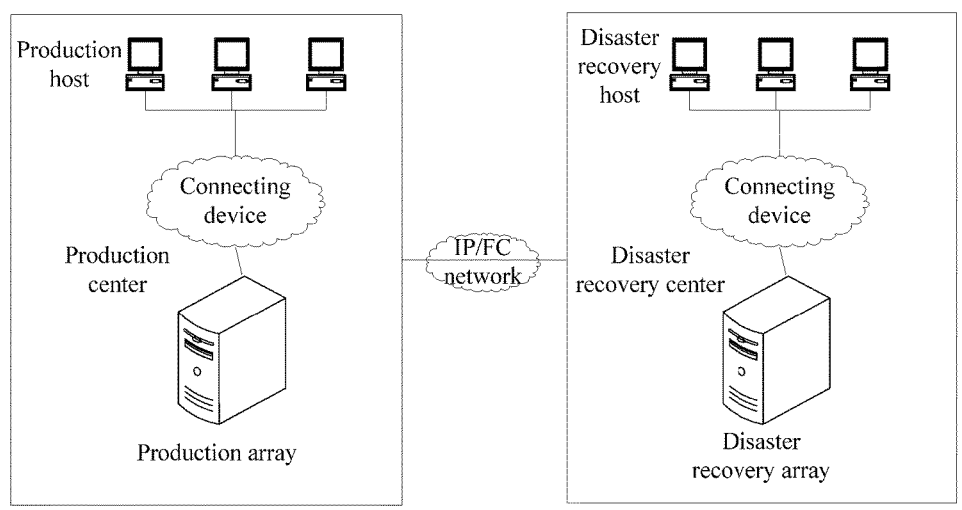
FIG. 1 is a schematic diagram of application network architecture of a data sending method according to an embodiment of the present invention.

A data sending method provided in an embodiment of the present invention may be implemented in a storage device. FIG. 1 is a schematic diagram of system architecture of a data sending method provided in an embodiment of the present invention. As shown in FIG. 1, a production center includes one or more production hosts, a connecting device, and a production array (corresponding to a first storage device in the following embodiments); and a system architecture of a disaster recovery center is similar to that of the production center, including disaster recovery hosts, a connecting device, and a disaster recovery array (corresponding to a second storage device in the following embodiments). In the embodiment of the present invention, there may be more than one disaster recovery center. The production center and the disaster recovery center may transmit data over IP (Internet Protocol) or FC (Fiber Channel). There may be a control center between the production center and the disaster recovery center. The control center may be deployed on the production center side or on the disaster recovery center side, or deployed on a third-party device between the production center and the disaster recovery center. The control center is configured to send a signal to the disaster recovery array when the production array is faulty, so that the disaster recovery array takes over host services of the production array.

The production hosts and the disaster recovery hosts may be any computer devices known in the prior art, such as servers and desk-top computers. Inside a host, an operating system and other application programs are installed.

The connecting device may include any interface known in the prior art, between a storage device and a host, such as a fiber switch or other currently available switches.

The production array and the disaster recovery array may both be a storage device known in the prior art, such as a disk drive formed by one or more interconnected Redundant Array of Inexpensive Disks (RAID), Just a Bunch Of Disks (JBOD), and one or more interconnected disk drives, such as a tape library, or a tape storage device of one or more storage units, where the one or more interconnected disk drives are of a Direct Access Storage Device (DASD).

The storage space of the production array may include multiple data volumes. A data volume is logical storage space formed by mapping physical storage space. For example, a data volume may be Logic Unit Number (LUN), or a file system. In this embodiment of the present invention, the disaster recovery array has a similar structure to the production array.

Referring to FIG. 1, FIG. 1 illustrates a data sending method according to an embodiment of the present invention. This embodiment of the present invention is applied in a first storage device, where the first storage device includes a controller, a cache memory (hereinafter referred to as cache or cache), and a storage medium. The controller is a processor of the first storage device and configured to execute 10 commands and other data services. The cache is a memory located between the controller and a hard disk, with a smaller capacity but much higher speed than a hard disk. The storage medium is a primary memory of the first storage device, which is generally a non-volatile storage medium, such as a magnetic disk. In the embodiment of the present invention, all physical storage space included in the first storage device is referred to as the storage medium. Specifically, the following steps may be executed by the controller in the first storage device.

Step S101: The first storage device receives a first write data request sent by a host, where the first write data request carries data to be written and address information.

The address information may include a Logic Block Address (LBA). When the first storage device includes multiple data volumes, the address information may further include an ID of a data volume of the first storage device.

Step S102: Add a first number to the data to be written and address information, and write the data to be written and the address information to the cache, where the first number is a current time period number.

The first storage device may include a current time period number manager, and the current time period number manager stores the current time period number. The current time period number may be a numeric, such as 0, 1, or 2, or a letter, such as a, b, or c, which is not limited herein.

When the first write data request is received, a first number is added to the data to be written and address information carried in the first write data request, where the first number is a value assigned by the current time period number.

After the first number is added to the information carried in the first write data request, the modified information carried in the first write data request is written to the cache, so that the data to be written, the address information, and the first number that are carried in the first write data request are all stored in the cache.

In addition, within a period of time, another write data request may also be received, and it is also necessary to add the first number to the information carried in the write data request and write the information to the cache. It should be noted that, before the current time period number changes, the first number is added to information carried in all write data requests.

Step S103: Read the data to be written and address information corresponding to the first number from the cache.

When a replication task is triggered, the first storage device may read the data to be written and address information corresponding to the first number from the cache. It is understandable that there may be multiple pieces of data to be written and address information corresponding to the first number.

A replication task means that the first storage device sends information carried in write data requests received by one data volume within a period of time to a second storage device, where a same number as the current time period number is added to the information carried in all the write data requests. A replication task may be triggered by a timer, or triggered manually, which is not limited herein. The purpose of replication is to send the data to be written carried in write data requests that are received by the first storage device to the second storage device, so that the second storage device can take over work of the first storage device when the first storage device is faulty. It is understandable that the address information (such as an LBA) carried in the write data request also needs to be sent to the second storage device, where the LBA is used to indicate an address where the second storage device stores the data to be written. Because the second storage device has the same physical structure as the first storage device, an LBA applicable to the first storage device is also applicable to the second storage device.

In the embodiment of the present invention, a replication task is specific to a data volume of the first storage device. When the first storage device includes multiple data volumes, each data volume corresponds to one replication task.

Step S104: Modify the current time period number to identify information carried in a subsequent write data request.

When a replication task is triggered, the current time period number manager needs to modify the current time period number. When a subsequent write data request is received, another number needs to be added to information carried in the subsequent write data request, where the another number is a value assigned by the modified current time period number. Thereby, in the cache, information carried in a write data request to be sent to the second storage device can be distinguished from information carried in a write data request being received by the first storage device.

It should be noted that step S103 and step S104 are not subject to a time sequence.

Step S105: Send the data to be written and address information to the second storage device.

The first storage device sends the data to be written and address information corresponding to the first number and read from the cache to the second storage device.

Specifically, the first storage device may send all read data to be written and address information to the second storage device directly. Or, the first storage device may, after obtaining IDs of data volumes of the second storage device, generate new write data requests according to the data to be written and address information carried in each write data request and the IDs of the data volumes of the second storage device, and then send the new write data requests to the second storage device.

In the embodiment of the present invention, after the first storage device receives a write data request sent by a host, where information carried in the write data request includes data to be written and address information, the first storage device adds a first number to the data to be written and address information and writes the information to the cache, where the first number is a current time period number. When a replication task is triggered, the first storage device reads the data to be written and address information corresponding to the first number from the cache and sends the information to the second storage device. In addition, when a replication task is triggered, the first storage device modifies the current time period number, so that the first storage device, when receiving a write data request subsequently, adds a same number as the modified current time period number to information carried in the write data request. Thereby, in the cache, information carried in a write data request to be sent to the second storage device is distinguished from information carried in a write data request being received by the first storage device. This implements direct sending of information carried in a write data request from the cache to the second storage device. Because information is sent directly from the cache without the need to read it from a data volume, the data replication time is short, which increases efficiency of data replication.

It is understandable that, in the foregoing embodiment, when a replication task is triggered, the first storage device sends the data to be written and address information corresponding to the current time period number to the second storage device, and also modifies the current time period number to identify information carried in a subsequent write data request. When a subsequent replication task is triggered, the first storage device sends the data to be written and address information corresponding to the modified current time period number to the second storage device, and modifies the current time period number again. This ensures that the first storage device sends information carried in received write data requests completely to the second storage device in batch.

However, when there are multiple disaster recovery centers, assuming that a storage device corresponding to a second disaster recovery center is a third storage device, the first storage device also needs to send information carried in write data requests received by the first storage device to the third storage device. For the second storage device, when a replication task is triggered, the current time period number manager will modify the current time period number. At this time, the number assigned by the current time period number to the second storage device and that assigned to the third storage device are both the modified numbers. The information carried in write data requests corresponding to the number before the current time period number is modified, however, has not yet been sent to the third storage device.

Therefore, in a scenario of multiple disaster recovery centers, the foregoing embodiment may further include the following steps:

Step S106: Record a second number, where the second number is a number corresponding to a latest completed replication task before a current replication task.

In the foregoing embodiment, the first number is the same as the current time period number and can be used to identify the current replication task. The current replication task means that the first storage device sends the information carried in write data requests received by one data volume within the current period of time to the second storage device, where a same number as the current time period number is added to the information carried in all the write data requests.

The second number is a number corresponding to the latest completed replication task before the current replication task.

When there are multiple disaster recovery centers, the current time period number may be modified when a replication task is initiated to a storage device in another disaster recovery center. Therefore, it is necessary to record the number corresponding to a previously completed replication task.

If another number exists between the second number and the first number, information carried in a write data request corresponding to this number is not sent to the second storage device and step S107 needs to be executed.

Step S107: Read, from the cache, data to be written and address information corresponding to a number following the second number and preceding the first number.

The specific reading process is similar to step S103, which will not be further described herein.

It should be noted that step S107 and step S103 may not be subject to a time sequence and they may be executed simultaneously.

Step S108: Send the data to be written and address information corresponding to the number following the second number and preceding the first number to the second storage device.

The specific sending process is similar to step S105, which will not be further described herein.

In the embodiment of the present invention, not only information carried in write data requests corresponding to the current time period number is sent to the second storage device, but also information carried in write data requests corresponding to a number between the number corresponding to the previously completed replication task and the current time period number is sent to the second storage device. This is applicable to a scenario of multiple disaster recovery centers and ensures the integrity of data replication.

Figure 2:
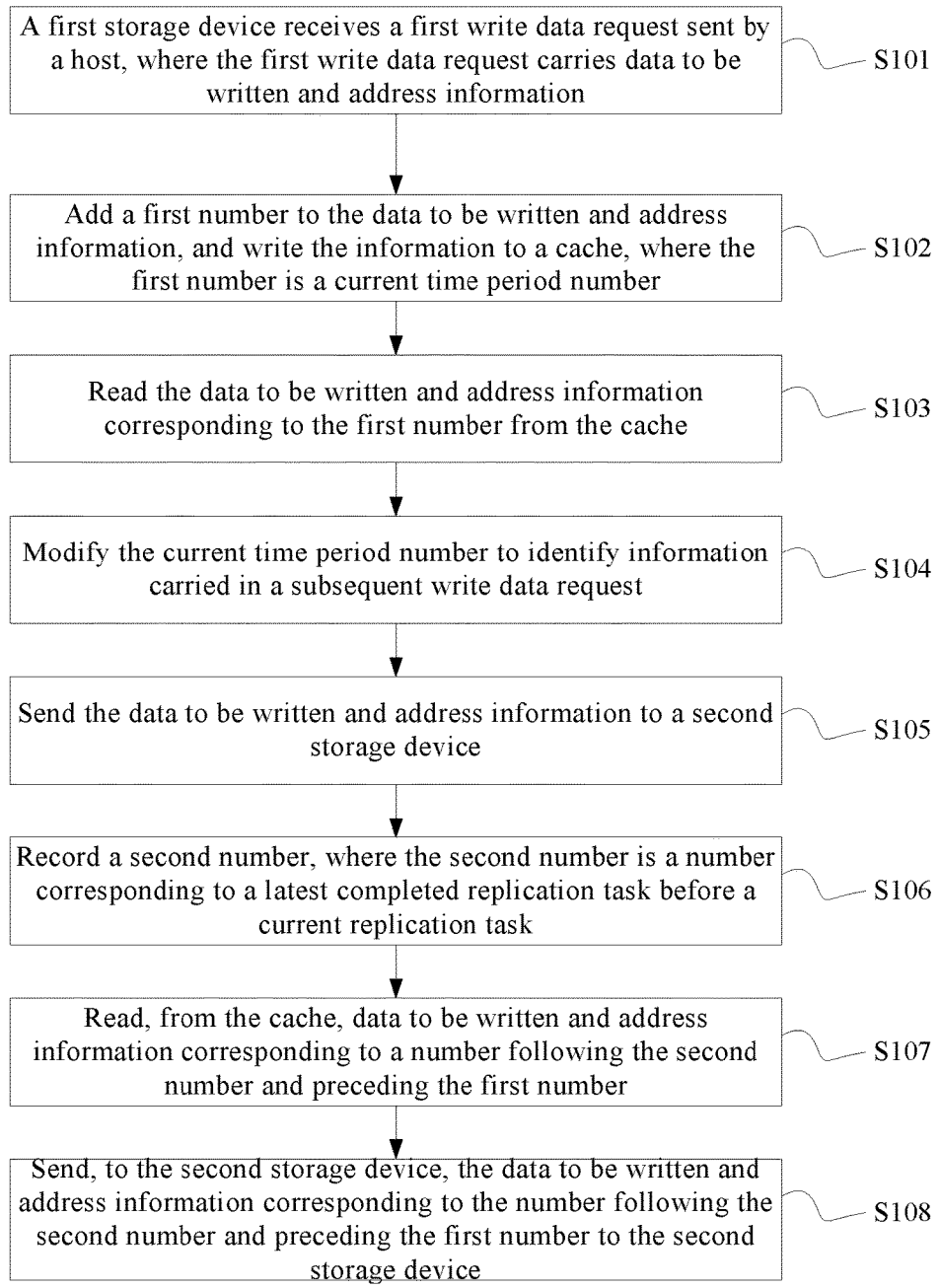
FIG. 2 is a flowchart of a data sending method according to an embodiment of the present invention.

Referring to FIG. 2, FIG. 2 illustrates an embodiment of a data receiving method according to the present invention. The embodiment of the present invention is applicable to a scenario where a disaster recovery center receives information carried in a write data request sent by a production center. The method may include the following steps:

Step S201: A second storage device receives address information sent by a first storage device.

Specifically, the second storage device may receive data to be written and address information sent by the first storage device; or the second storage device may receive a write data request sent by the first storage device, where the write data request includes data to be written and address information, where the address information may be a Logic Unit Address (LBA). When the second storage device includes multiple data volumes, the address information may further include an ID of a data volume of the second storage device. It is understandable that there may be more than one piece of address information.

After receiving the data to be written and address information, the second storage device adds a same number as a current time period number to the data to be written and address information and writes the information to a cache, so that the same number as the current time period number, the data to be written and address information are stored in the cache.

It should be noted that the second storage device also includes a current time period number manager, and the time slice number manager stores the current time period number. The current time period number may be a numeric, such as 0, 1, or 2, or a letter, such as a, b, or c, which is not limited herein. The current time period number here may have no relation with the current time period number in the first storage device.

Step S202: When it is determined that the first storage device has failed, the second storage device obtains, according to the address information, data to be written corresponding to a first number, where address information corresponding to the first number is the same as the received address information and the first number is a number preceding the current time period number.

Generally, if both the first storage device and the second storage device operate normally, the second storage device may receive information carried in all write data requests sent by the first storage device, add a same number as the current time period number to information carried in each write data request, and store the information in the cache. However, if the first storage device is faulty, the second storage device may possibly receive only a part of the data to be written corresponding to the current time period number of the first storage device. In this case, the data stored by the second storage device is possibly untrue, and if the second storage device takes over work of the first storage device directly, data consistency cannot be guaranteed. For example, if a host sends a read data request to the second storage device at this time, requesting to read data stored in the address information, the second storage device will search for a latest number corresponding to the address information and then send data to be written corresponding to the current time period number to the host, however, the data is untrue. Therefore, in this case, it is necessary to restore data corresponding to a number preceding the current time period number of the second storage device from the data in the cache of the second storage device.

Specifically, that the first storage device has failed may be determined in a manner in which a control center sends a signal to the second storage device, where the signal is used to indicate that the first storage device has failed and that the second storage device needs to take over host services of the first storage device.

Generally, when a replication task is completed, the control center may send a replication success indication to both the first storage device and the second storage device. If the second storage device does not receive the indication, it indicates that a current replication task is not completed. Completion of a replication task means that the first storage device has sent information carried in all write data requests corresponding to the current time period number to the second storage device and that the second storage device has finished receiving the information.

When the second storage device determines that the first storage device has failed, if the current replication task is completed, the second storage device can take over work of the first storage device directly and data consistency can be guaranteed. This situation is beyond the discussion of the embodiment of the present invention.

However, if the current replication task is not completed, it is necessary to restore data corresponding to a number preceding the current time period number of the second storage device from the data in the cache of the second storage device.

A specific restoration manner may be: according to the received address information, checking whether address information corresponding to a number preceding the current time slice number is identical to the received address information exists, if not, continuing to check address information corresponding to a further preceding number until address information identical to the received address information is found, and then obtaining data to be written corresponding to the number.

Step S203: Add a second number to the data to be written and address information corresponding to the first number and write the information to a cache.

The second number is a number obtained by modifying the current time period number and also the latest number stored in the cache in the embodiment of the present invention. When a host sends a read data request to the second storage device, requesting to read data stored in the address information, the second storage device learns by searching that the latest number corresponding to the address information is the second number and sends data to be written corresponding to the second number to the host. Thereby, data consistency is guaranteed.

In the embodiment of the present invention, the second storage device receives address information sent by the first storage device, and when the first storage device is faulty, obtains data to be written corresponding to a number preceding the current time period number, adds a second number to the data to be written and address information corresponding to the number preceding the current time slice number, and stores the information in a cache. Thereby, data consistency is guaranteed.

Figure 3:
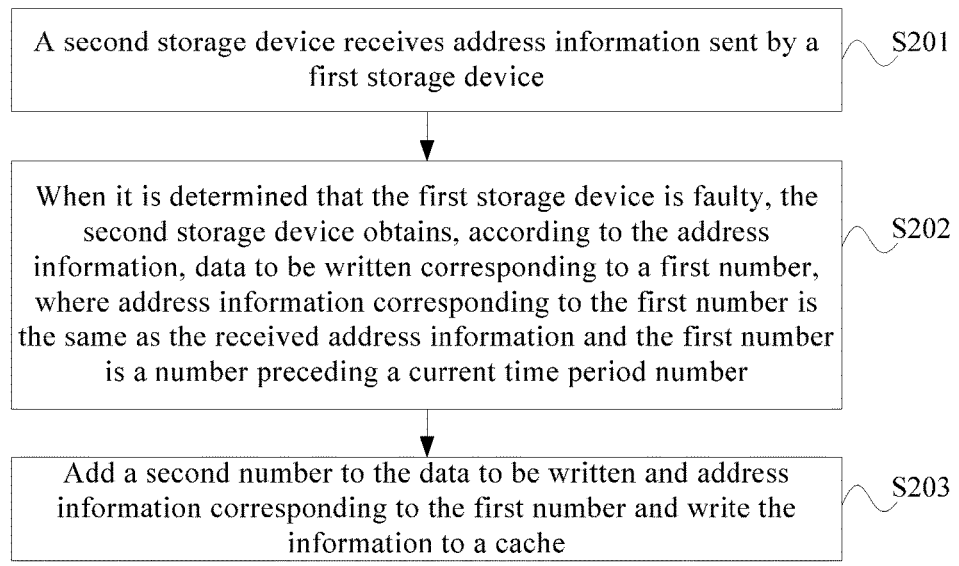
FIG. 3 is a flowchart of a data receiving method according to an embodiment of the present invention.

Referring to FIG. 3, FIG. 3 illustrates an embodiment of a data sending method according to the present invention. In the embodiment of the present invention, to distinguish between a cache in a production array and a cache in a disaster recovery array, the cache in the production array is referred to as a first cache and the cache in the disaster recovery array is referred as a second cache in the embodiment of the present invention.

As shown in FIG. 3, the method includes the following steps:

Step S301: The production array receives a write data request A from a production host.

The write data request A includes a volume ID, a write address A, and data to be written A. The write address A is a logical address of a production array where the data to be written A is to be written, such as an LBA. Generally, when the production array executes the write data request A, the production array needs to translate the LBA into a Physical Block Address (PBA) and then writes the data to be written A to a storage medium according to the PBA. The volume ID is an ID of a data volume corresponding to the write data request A. In this embodiment, it is assumed that the production array includes one volume (hereinafter referred to as primary volume). Then, information carried in the write data request A includes a primary volume ID, the write address A, and the data to be written A.

Step S302: The production array modifies the write data request A to a write data request A', and the write data request A' includes information carried in the write data request A and a first number.

In the embodiment of the present invention, a controller of the production array may include a current time period number (CTPN) manager. The CTPN manager records a current time period number which is used to generate the first number, and specifically the first number equals the current time period number.

After receiving the write data request A, the production array modifies the write data request A to the write data request A'. Specifically, a modification manner may be adding the first number to the information carried in the write data request A. For example, when the current time period number is 1, the first number is also 1.

Optionally, a timestamp may be recorded when the write data request A is received and the timestamp is matched in a pre-stored number sequence so as to determine a number corresponding to the timestamp. Specifically, the number sequence may be a mapping table or in other forms, which is not limited herein. The number sequence includes multiple numbers, where each number corresponds to a section of timestamps, as show in Table 1.

TABLE 1

| Number | Section of timestamps |
| --- | --- |
| 1 | 9:01-10:00 |
| 2 | 10:01-11:00 |
| 3 | 11:01-12:00 |

Assuming that the timestamp when the write data request A is received is 9:30, the corresponding number is 1 and then the write data request A can be modified to the write data request A' according to the number.

Step S303: The production array writes the write data request A' to the first cache, so that information carried in the write data request A' is stored in the first cache. The information carried in the write data request A' includes the first number, the primary volume ID, the write address A, and the data to be written A.

In the embodiment of the present invention, the first number may correspond to multiple write data requests. Before the current time period number recorded in the CTPN is modified, the first number is added to information carried in all received write data requests.

It is understandable that, after the write data request A is received, a write data request B may be received and modified to a write data request B', so that the write data request B' further includes the first number; and a write data request C may also be received and modified to a write data request C', so that the write data request C' further includes the first number.

For example, after the write data request A', the write data request B', and the write data request C' are written to the first cache, the information stored in the first cache may be shown in Table 2.

TABLE 2

| Number | Volume ID | Write address | Data to be written |
| --- | --- | --- | --- |
| 1 | Primary volume ID | Write address A | Data to be written A |
| 1 | Primary volume ID | Write address B | Data to be written B |
| 1 | Primary volume ID | Write address C | Data to be written C |

It should be noted that, in the embodiment of the present invention, it is assumed that the production array includes one data volume (which may be referred to as a primary volume), IDs of data volumes carried in the write data request A', the write data request B' and the write data request C' are all the primary volume IDs. In another embodiment of the present invention, the production array may include multiple data volumes, and therefore IDs of data volumes carried in the write data request A', the write data request B' and the write data request C' may be different. In addition, Table 2 is only an example of storage of information carried in write data requests in the first cache. Alternatively, the information may be stored in form of a tree. The storage form is not limited herein.

Taking Table 2 as an example, the numbers, the volume IDs, and the write addresses may be regarded as indexes of Table 2. According to the indexes, corresponding data to be written can be found. When indexes are the same, the data to be written corresponding to the indexes should also be the same. Therefore, when a new write data request is written, it is necessary to determine whether same information as a number, a volume ID and a write address of the new write data request is stored in the first cache, and if yes, the information carried in the new write data request is used to override the old information. It is understandable that, when the write data request A', write data request B', and write data request C' are written to the first cache, it is also necessary to determine whether their numbers, volume IDs, and write addresses are the same as information already stored in the first cache, and because their numbers, volume IDs, and write addresses are different from the information already stored in the first cache, the write data request A', write data request B', and write data request C' can all be written to the first cache.

For example, if a write data request D is received then and the write data request D includes the primary volume ID, the write address B, and data to be written D, the write data request D is modified to a write data request D', so that the write data request D' further includes the first number. Therefore, when the write data request D' is written to the first cache, it is necessary to determine whether same information as the number, volume ID, and write address of the write data request D' is stored in the first cache, and if yes, the information carried in the write data request D' is used to override the old information. Because the number, the volume ID, and the write address carried in the write data request D' are all the same as the number, the volume ID, and the write address included in the write data request B', in the first cache, the information of the write data request D' will override the information of the write data request B'.

Specifically, after the write data request D' is written to the first cache, the information stored in the first cache may be shown in Table 3.

TABLE 3

| Number | Volume ID | Write address | Data to be written |
|---|---|---|---|
| 1 | Primary volume ID | Write address A | Data to be written A |
| 1 | Primary volume ID | Write address B | Data to be written D |
| 1 | Primary volume ID | Write address C | Data to be written C |

Step S304: When a replication task is triggered, the production array modifies the current time period number included in the CTPN manager, for example, may modify the current time period number from 1 to 2.

In order to distinguish between the current time period number of the production array and the current time period number of the disaster recovery array, in the embodiment of the present invention, the current time period number of the production array is referred to as a first current time period number, and the current time period number of the disaster recovery array is referred to as a second current time period number.

It is understandable that, after the first current time period number is modified from 1 to 2, accordingly, the number 2 will be added to information carried in all write data requests received afterwards. For example, a write data request E is received and the write data request E includes the primary volume ID, the write address A, and data to be written E, and then the write data request E is modified to a write data request E', so that the write data request E' further includes the number 2. A write data request F is received and the write data request F includes the primary volume ID, a write address F, and data to be written F, and then the write data request F is modified to a write data request F', so that the write data request F' further includes the number 2. After the write data request E' and the write data request F' are written to the first cache, the information stored in the first cache may be shown in Table 4.

TABLE 4

| Number | Volume ID | Write address | Data to be written |
|---|---|---|---|
| 1 | Primary volume ID | Write address A | Data to be written A |
| 1 | Primary volume ID | Write address B | Data to be written D |
| 1 | Primary volume ID | Write address C | Data to be written C |
| 2 | Primary volume ID | Write address A | Data to be written E |
| 2 | Primary volume ID | Write address F | Data to be written F |

Step S305: The disaster recovery array modifies the second current time period number included in its CTPN manager, for example, may modify it from 11 to 12.

In the embodiment of the present invention, the disaster recovery array may also include its own CPTN manager. When a replication task of the production array is triggered, the CTPN manager of the production array modifies the first current time period number, and the control center may also send a control signal to the disaster recovery array, so that the disaster recovery array also modifies the second current time period number includes in its CPTN manager. Therefore, step S305 and step S304 are not subject to a time sequence.

Step S306A: The production array reads information carried in write data requests corresponding to the first number from the first cache.

Specifically, according to the above description, the information carried in write data requests corresponding to the first number is shown in Table 3.

Step S306B: The production array obtains an ID of a data volume to be written to the disaster recovery array.

Step S306C: The production array generates new write data requests according to the data volume ID and the information carried in the write data requests corresponding to the first number.

Specifically, a write data request A" may be generated according to the data volume ID, the write address A, and the data to be written A; a write data request D" may be generated according to the data volume ID, the write address B, and the data to be written D; and a write data request C" may be generated according to the data volume ID, the write address C, and the data to be written C.

In another embodiment of the present invention, both the production array and the disaster recovery array may include multiple data volumes, and therefore IDs of data volume included in the write data request A", the write data request D" and the write data request C" may be different. However, IDs of data volumes in the disaster recovery array are in one-to-one mapping with IDs of data volumes in the production array.

Step S307: The production array send the generated new write data requests to the disaster recovery array.

Specifically, the production array sends the write data request A", the write data request D", and the write data request C" to the disaster recovery array.

Step S308: The disaster recovery array modifies the received write data requests.

For example, the disaster recovery array may modify the write data request A" to a write data request A'" according to the second current time period number recorded in the CTPN manager. Specifically, a modification manner may be adding the number 12 to information carried in the write data request A".

Similarly, the number 12 may be added to information carried in the write data request B" and the write data request B" is modified to a write data request B'"; and the number 12 may be added to information carried in the write data request C" and the write data request C" is modified to a write data request C'".

Step S309: The disaster recovery array writes the modified write data requests to the second cache.

Specifically, the information stored in the second cache may be shown in Table 5.

TABLE 5

| Number | Volume ID | Write address | Data to be written |
|---|---|---|---|
| 12 | Secondary volume ID | Write address A | Data to be written A |
| 12 | Secondary volume ID | Write address B | Data to be written D |
| 12 | Secondary volume ID | Write address C | Data to be written C |

Step S310: According to the write addresses in the write data requests, the disaster recovery array writes the data to be written to storage media corresponding to the write addresses.

Generally, the cache space is limited. Therefore, when its utilization rate reaches a specific threshold, it is necessary to write data in the cache to a hard disk. Specifically, the data to be written A is written to a storage medium corresponding to the write address A, and the data to be written D is written to a storage medium corresponding to the write address B, and the data to be written C is written to a storage medium corresponding to the write address C.

Step S311: According to the write addresses in the write data requests, the production array writes the data to be written to storage media corresponding to the write addresses.

Similarly, when the utilization rate of the cache space of the production array reaches a specific threshold, it is also necessary write the data in the cache to a hard disk. As can be learned from the above description, the following information is stored in the first cache.

| Number | Volume ID | Write address | Data to be written |
|---|---|---|---|
| 1 | Primary volume ID | Write address A | Data to be written A |
| 1 | Primary volume ID | Write address B | Data to be written D |
| 1 | Primary volume ID | Write address C | Data to be written C |
| 2 | Primary volume ID | Write address A | Data to be written E |
| 2 | Primary volume ID | Write address F | Data to be written F |

Specifically, for write data requests with the same volume ID, the same write address but different numbers, data to be written carried in a write data request with a smaller number is first written, then data to be written carried in a write data request with a larger number is written. For example, the data to be written D is first written and then the data to be written E is written. Or, data to be written carried in a write data request with a larger number is written directly without writing data to be written carried in a write data request with a smaller number. For example, the data to be written E is written directly.

Step S310 and step S311 are not subject to a time sequence.

Step S312: When a replication task is triggered, the production array modifies the first current time period number included in its CTPN manager, for example, may modify the current time period number from 2 to 3.

It is understandable that, after the first current time period number in the CTPN of the production array is modified from 2 to 3, accordingly, the number 3 will be added to information carried in all write data requests received by the production array afterwards.

Step S313: The disaster recovery array modifies the second current time period number included in its CTPN manager, for example, may modify the second current time period number from 12 to 13.

It is understandable that, after the second current time period number in the CTPN manager of the disaster recovery array is modified from 12 to 13, accordingly, the number 13 will be added to information carried in all write data requests received by the disaster recovery array afterwards.

Step S314: The production array reads information carried in write data requests corresponding to the number 2, generates corresponding write data requests, and sends the generated write data requests to the disaster recovery array.

Specifically, as can be learned from the above description, the information carried in write data requests corresponding to the number 2 includes information carried in the write data request E and information carried in the write data request F. Similarly, after the production array obtains the data volume ID of the disaster recovery array, the production array may generate a write data request E'' according to the data volume ID, the write address A, and the data to be written E, and generate a write data request F'' according to the data volume ID, the write address F, and the data to be written F. Therefore, the write data requests sent by the production array to the disaster recovery array are the write data request E'' and the write data request F''.

It should be noted that, in the embodiment of the present invention, the production array does not send the write data requests to the disaster recovery array in a time sequence, and may also send the write data requests randomly. Specifically, the production array may first send the write data request E'' and then the write data request F'', or first send the write data request F'' and then the write data request E''.

As can be learned from the above description, at this time, the second current time period number in the CTPN manager of the disaster recovery array is 13. Therefore, after receiving the write data request E'', the disaster recovery array needs to modify the write data request E'' to a write data request E''' that includes the number 13. Similarly, after receiving the write data request F'', the disaster recovery array needs to modify the write data request F'' to a write data request F''' that includes the number 13.

Step S315: The disaster recovery array receives an instruction to take over host services of the production array.

In the embodiment of the present invention, if the production array is faulty, the disaster recovery array needs to take over host services of the production array. Therefore, the disaster recovery array needs to satisfy a requirement of data consistency.

As can be learned from step S314, in a current replication task, write data requests to be received by the disaster recovery array include the write data request E'' and the write data request F''. The disaster recovery array will not take over host services of the production array until the modified write data request E'' and write data request F'' are both successfully written to the second cache. When the disaster recovery array starts to take over host services, it indicates that the current replication cycle is completed and the requirement of data consistency is satisfied.

After the disaster recovery array has modified the write data request E'' to the write data request E''' and written the write data request E' successfully to the second cache but before the write data request F''' is written successfully to the second cache, if the production array is faulty and the disaster recovery array starts to take over host services of the production array, the current replication task is not completed yet and the requirement of data consistency is not satisfied. Similarly, after the disaster recovery array has modified the write data request F'' to the write data request F' and written the write data request F' successfully to the second cache but before the write data request E''' is written successfully to the second cache, if the production array is faulty and the disaster recovery array starts to take over host services of the production array, the current replication task is not completed either and the requirement of data consistency is not satisfied.

In this case, it is necessary to restore the data in the cache of the disaster recovery array to a state when the replication task corresponding to the number 12 is completed. In the following, it is assumed that the disaster recovery array has modified the write data request E'' to the write data request E''' and has successfully written the write data request E''' to the second cache and that the write data request F' is not successfully written to the second cache.

Step S316: The disaster recovery array obtains a write address carried in a write data request that has been successfully written to the second cache in the current replication cycle.

As can be learned from the above description, in the replication task corresponding to the number 13, the write data request E''' has been successfully written to the second cache and the write address carried in the write data request E' is the write address A.

Step S317: According to the write address, the disaster recovery array performs matching in the information carried in write data requests corresponding to a preceding number to search for a same write address as the write address A.

When a same write address as the write address is found, step S318 is executed. Otherwise, matching is continued to be performed in the information carried in write data requests corresponding to a further preceding number (for example, the number 11) until a same write address as the write address A carried in the write data request E''' is found.

As can be learned from the above description, the information carried in write data requests corresponding to the number 12 is shown in Table 5. The write address carried in the write data request A'' is the same as the write address carried in the write data request E'''.

It is understandable that, when the disaster recovery array includes multiple data volumes and the information carried in each write data request includes an ID of a data volume, it is required that both the write address and the data volume ID should be matched.

Step S318: Generate a new write data request according to the information including the found write address, and write the new write data request to the second cache, where the new write data request includes a modified number.

For example, the information read from the second cache includes the write address A and the data to be written A (and may also include the secondary volume ID), and then a new write data request may be generated according to the read information and the modified number (for example, the number is modified from 13 to 14). After the new write data request is written to the second cache, a mapping relationship stored in the cache is shown in Table 6.

TABLE 6

| Number | Volume ID | Write address | Data to be written |
|---|---|---|---|
| 12 | Secondary volume ID | Write address A | Data to be written A |
| 12 | Secondary volume ID | Write address B | Data to be written D |
| 12 | Secondary volume ID | Write address C | Data to be written C |
| 13 | Secondary volume ID | Write address A | Data to be written E |
| 14 | Secondary volume ID | Write address A | Data to be written A |

When a host sends a read data request to the disaster recovery array, the requested data volume ID is the secondary volume ID and the write address is the write address A, the disaster recovery array will search the second cache for data to be written with the secondary volume ID and the write address A and corresponding to the latest number, and send the data to be written to the host. In the embodiment of the present invention, the data to be written A corresponding to the number 14 is sent from the second cache to the host.

In the embodiment of the present invention, the production array may send information carried in received write data requests from a cache to the disaster recovery array directly without the need to read related information from a data volume, which increases the efficiency of data replication and guarantees data consistency for the disaster recovery array.

In the prior art, data replication is implemented by using snapshot data, where, every time the production array executes a write data request, it is necessary to first place data carried in the write data request in a cache, read, according to a write address carried in the write data request, old data stored in the address, store the data in a data volume, and then write the data in the cache to the write address. A response message of the write data request is not returned until all these operations are completed. Because of the additional snapshot processing steps, the delay in processing a write data request is prolonged. In the embodiment of the present invention, however, snapshot processing does not need to be performed on data and therefore, although write data requests are modified, the time consumed is short. Therefore, compared with the prior art, the embodiment of the present invention reduces the delay in processing a write data request.

Figure 5:
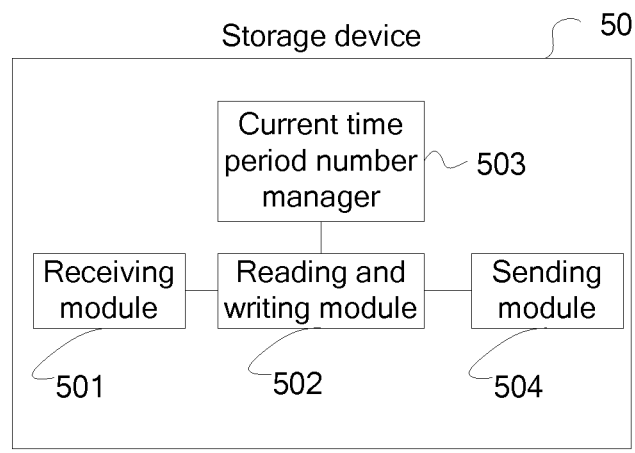
FIG. 5 is a schematic structural diagram of a storage device according to an embodiment of the present invention.

Referring to FIG. 5, FIG. 5 is a schematic structural diagram of a storage device 50 according to an embodiment of the present invention. As shown in FIG. 5, the storage device 50 includes a receiving module 501, a reading and writing module 502, a current time period number manager 503, and a sending module 504.

The receiving module 501 is configured to receive a first write data request sent by a host, where the first write data request carries data to be written and address information.

The address information may include a logical block address (Logic Unit Address, LBA). When the storage device 50 includes multiple data volumes, the address information may further include an ID of a data volume of the storage device 50.

The reading and writing module 502 is configured to add a first number to the data to be written and address information and write the information to a cache, where the first number is a current time period number; and read the data to be written and address information corresponding to the first number from the cache.

The storage device 50 may include a current time period number manager 503, and the current time period number manager 503 stores the current time period number, where the current time period number may be a numeric, such as 0, 1, or 2, or a letter, such as a, b, or c, which is not limited herein.

When the first write data request is received, a first number is added to the data to be written and address information carried in the first write data request, where the first number is a value assigned by the current time period number.

After the first number is added to the information carried in the first write data request, the modified information carried in the first write data request is written to the cache, so that the data to be written, the address information, and the first number carried in the first write data request are all stored in the cache.

In addition, within a period of time, another write data request may also be received, and it is also necessary to add the first number to the information carried in the write data request and write the information to the cache. It should be noted that, before the current time period number changes, the first number is added to information carried in all write data requests.

When a replication task is triggered, the storage device 50 may read the data to be written and address information corresponding to the first number from the cache. It is understandable that there may be multiple pieces of data to be written and address information corresponding to the first number.

A replication task means that the storage device 50 sends information carried in write data requests that are received by a data volume within a period of time to a storage device in a disaster recovery center, where a same number as the current time period number is added to the information carried in all the write data requests. A replication task may be triggered by a timer, or triggered manually, which is not limited herein. The purpose of replication is to send the data to be written carried in write data requests received by the storage device 50 to the storage device in the disaster recovery center, so that the storage device in the disaster recovery center can take over work of the storage device 50 when the storage device 50 is faulty. It is understandable that the address information (such as an LBA) carried in the write data request also needs to be sent to the storage device in the disaster recovery center, where the LBA is used to indicate an address where the storage device in the disaster recovery center stores the data to be written. The storage device in the disaster recovery center has the same physical structure as the storage device 50. Therefore, an LBA applicable to the storage device 50 is also applicable to the storage device in the disaster recovery center.

In the embodiment of the present invention, a replication task is specific to a data volume of the storage device 50. When the storage device 50 includes multiple data volumes, each data volume corresponds to one replication task.

The current time period number manager 503 is configured to modify the current time period number to identify information carried in a subsequent write data request.

When a replication task is triggered, the current time period number manager 503 needs to modify the current time period number. When a subsequent write data request is received, another number needs to be added to information carried in the subsequent write data request, where the another number is a value assigned by the modified current time period number. Therefore, in the cache, information carried in a write data request to be sent to the storage device in the disaster recovery center can be distinguished from information carried in a write data request being received by the storage device 50.

The sending module 504 is configured to send the data to be written and address information to the storage device in the disaster recovery center.

The storage device 50 sends the data to be written and address information corresponding to the first number read from the cache to the second storage device the storage device in the disaster recovery center.

Specifically, the storage device 50 may send all read data to be written and address information to the storage device in the disaster recovery center directly. Or, the storage device 50 may, after obtaining IDs of data volumes of the storage device in the disaster recovery center, generate new write data requests according to the data to be written and address information carried in each write data request and the IDs of the data volumes of the storage device in the disaster recovery center, and then send the new write data requests to the storage device in the disaster recovery center.

In the embodiment of the present invention, after the storage device 50 receives a write data request sent by a host, where information carried in the write data request includes data to be written and address information, the storage device 50 adds a first number to the data to be written and address information and writes the information to the cache, where the first number is a current time period number. When a replication task is triggered, the storage device 50 reads the data to be written and address information corresponding to the first number from the cache and sends the information to the storage device in the disaster recovery center. In addition, when a replication task is triggered, the storage device 50 modifies the current time period number, so that the storage device 50, when receiving a write data request subsequently, adds the same number as the modified current time period number to information carried in the write data request. Thereby, in the cache, information carried in a write data request to be sent to the storage device in the disaster recovery center is distinguished from information carried in a write data request being received by the storage device 50. This implements direct sending of information carried in a write data request from the cache to the storage device in the disaster recovery center. Because information is sent directly from the cache without the need to read it from a data volume, the data replication time is short, which increases efficiency of data replication.

Figure 6:
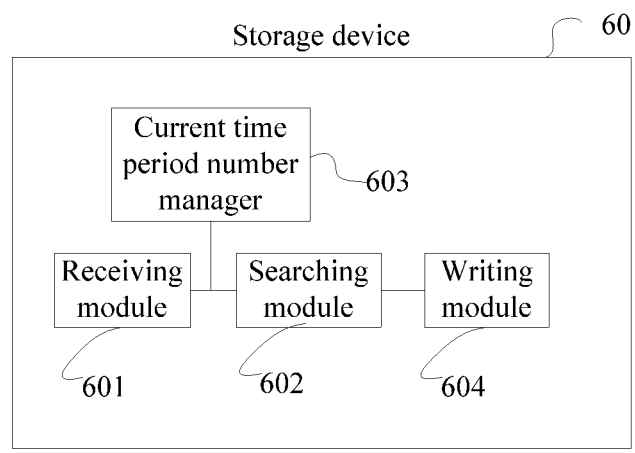
FIG. 6 is a schematic structural diagram of another storage device according to an embodiment of the present invention.

Referring to FIG. 6, FIG. 6 is a schematic structural diagram of a storage device 60 according to an embodiment of the present invention. As shown in FIG. 6, the storage device 60 includes a receiving module 601, a searching module 602, and a writing module 604.

The receiving module 601 is configured to receive address information sent by a storage device 50.

Specifically, the storage device 60 may receive data to be written and address information sent by the storage device 50; or the storage device 60 may receive a write data request sent by the storage device 50, where the write data request includes data to be written and address information, where the address information may be a logical block address (Logic Unit Address, LBA). When the storage device 60 includes multiple data volumes, the address information may further include an ID of a data volume of the storage device 60. It is understandable that there may be more than one piece of address information.

After receiving the data to be written and address information, the storage device 60 adds a same number as a current time period number to the data to be written and address information and writes the information to a cache, so that the same number as the current time period number, the data to be written, and the address information are stored in the cache.

It should be noted that the storage device 60 may also include a current time period number manager 603, and the current time period number manager 603 stores the current time period number. The current time period number may be a numeric, such as 0, 1, or 2, or a letter, such as a, b, or c, which is not limited herein. The current time period number here may have no relation with the current time period number in the storage device 50.

The searching module 602 is configured for: when it is determined that the storage device 50 has failed, the storage device 60 to obtain, according to the address information, data to be written corresponding to a first number, where address information corresponding to the first number is the same as the received address information and the first number is a number preceding the current time period number.

Generally, if both the storage device 50 and the storage device 60 operate normally, the storage device 60 may receive information carried in all write data requests sent by the storage device 50, add a same number as the current time period number to information carried in each write data request, and store the information in the cache. However, if the storage device 50 is faulty, the storage device 60 may possibly receive only a part of the data to be written corresponding to the current time period number of the storage device 50. In this case, the data stored by the storage device 60 is possibly untrue, and if the storage device 60 takes over work of the storage device 50 directly, data consistency cannot be guaranteed. For example, if a host sends a read data request to the storage device 60 at this time, requesting to read data stored in the address information (such as an LBA), the storage device 60 will search for a latest number corresponding to the address information and then send data to be written corresponding to the current time period number to the host, however, the data is untrue. Therefore, in this case, it is necessary to restore data corresponding to a number preceding the current time period number of the storage device 60 from the data in the cache of the storage device 60.

Specifically, that the storage device 50 has failed may be determined in a manner in which a control center sends a signal to the storage device 60, where the signal is used to indicate that the storage device 50 has failed and that the storage device 60 needs to take over host services of the storage device 50.

Generally, when a replication task is completed, the control center may send a replication success indication to both the storage device 50 and the storage device 60. If the storage device 60 does not receive the indication, it indicates that a current replication task is not completed. Completion of a replication task means that the storage device 50 has sent information carried in all write data requests corresponding to the current time period number to the storage device 60 and the storage device 60 has finished receiving the information.

When the storage device 60 determines that the storage device 50 has failed, if the current replication task is completed, the storage device 60 can take over work of the storage device 50 directly and data consistency can be guaranteed. This situation is beyond the discussion of the embodiment of the present invention.

However, if the current replication task is not completed, it is necessary to restore data corresponding to a number preceding the current time period number of the storage device 60 from the data in the cache of the storage device 60.

A specific restoration manner is: according to the received address information, searching address information corresponding to a number preceding the current time period number for same address information as the received address information, if the same address information is not found, continuing to search address information corresponding to a further preceding number until the address information is found, and then obtaining data to be written corresponding to the number.

The writing module 604 is configured to add a second number to the data to be written and address information corresponding to the first number and write the information to a cache.

The second number is a number obtained by modifying the current time period number and also the latest number stored in the cache in this embodiment. When a host sends a read data request to the storage device 60, requesting to read data stored in the address information (such as an LBA), the storage device 60 learns by searching that a latest number corresponding to the address information is the second number and sends data to be written corresponding to the second number to the host. Thereby, data consistency is guaranteed.

In the embodiment of the present invention, the storage device 60 receives address information sent by the storage device 50, and when the storage device 50 faulty, obtains data to be written corresponding to a number preceding the current time period number, adds a second number to the data to be written and address information corresponding to the number preceding the current time period number, and stores the information in a cache. Thereby, data consistency is guaranteed.

Figure 7:
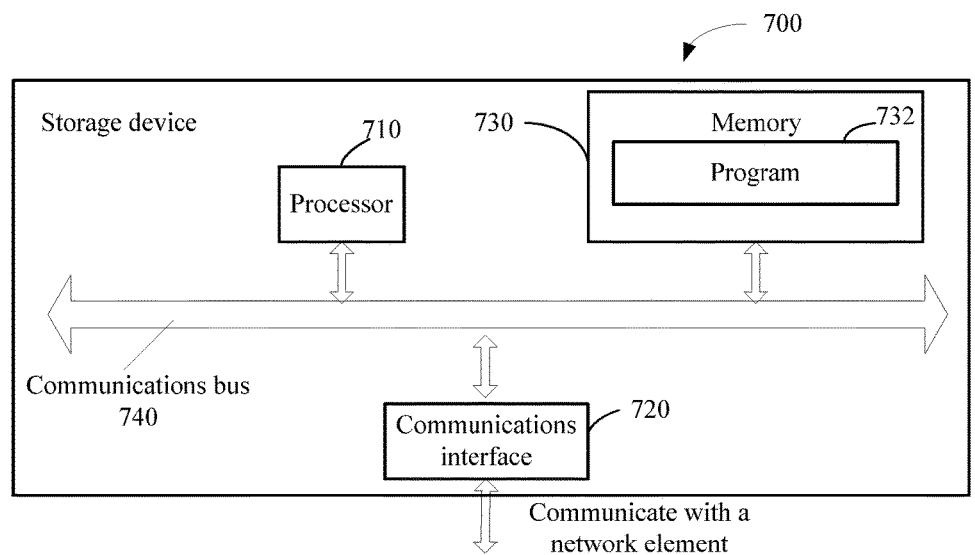
FIG. 7 is a schematic structural diagram of still another storage device according to an embodiment of the present invention.

Referring to FIG. 7, an embodiment of the present invention provides a storage device 700. The storage device 700 may include a storage device already known in the prior art. The embodiment of the present invention does not limit the specific implementation of the storage device 700. The storage device 700 includes:

a processor 710, a communications interface 720, a memory 730, and a communications bus 740.

The processor 710, the communications interface 720, and the memory 730 implement mutual communication by using the communications bus 740.

The communications interface 720 is configured to communicate with a network element, for example, with a host or a switch.

The processor 710 is configured to execute a program 732.

Specifically, the program 732 may include program code, and the program code includes a computer operation instruction.

The processor 710 may be a central processing unit CPU, or an Application Specific Integrated Circuit ASIC, or be configured to one or multiple integrated circuits that implement the embodiments of the present invention.

The memory 730 is configured to store the program 732. The memory 730 may include a high-speed RAM, or a non-volatile memory, for example, at least one magnetic disk memory.

The program 732 may specifically include:

a receiving module 501, configured to receive a first write data request sent by a host, where the first write data request carries data to be written and address information;

a reading and writing module 502, configured to add a first number to the data to be written and address information and write the information to a cache, where the first number is a current time period number; and read the data to be written and address information corresponding to the first number from the cache;

a current time period number manager 503, configured to modify the current time period number to identify information carried in a subsequent write data request; and a sending module 504, configured to send the data to be written and address information to a storage device in the disaster recovery center.

For specific implementations of the modules in the program 732, reference may be made to corresponding modules in the embodiment illustrated in FIG. 5, which will not be further described herein.

Figure 8:
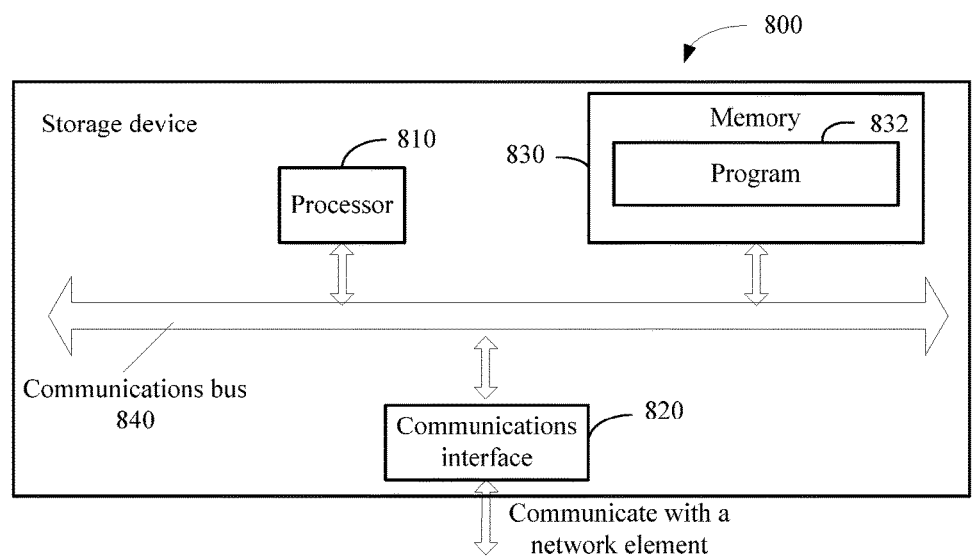
FIG. 8 is a schematic structural diagram of still another storage device according to an embodiment of the present invention.

Referring to FIG. 8, an embodiment of the present invention provides a storage device 800. The storage device 800 may include a storage device already known in the prior art. The embodiment of the present invention does not limit the specific implementation of the storage device 800. The storage device 800 includes:

a processor 810, a communications interface 820, a memory 830, and a communications bus 840.

The processor 810, the communications interface 820, and the memory 830 implement mutual communication by using the communications bus 840.

The communications interface 820 is configured to communicate with a network element, for example, with a host or a switch.

The processor 810 is configured to execute a program 832.

Specifically, the program 832 may include program code, and the program code includes a computer operation instruction.

The processor 810 may be a central processing unit CPU, or an application specific integrated circuit Application Specific Integrated Circuit (ASIC), or be configured to one or multiple integrated circuits that implement the embodiments of the present invention.

The memory 830 is configured to store the program 832. The memory 830 may include a high-speed RAM, or a non-volatile memory, for example, at least one magnetic disk memory.

The program 832 may specifically include:

a receiving module 601, configured to receive address information sent by a storage device 50;

a searching module 602, configured for: when it is determined that the storage device 50 has failed, a storage device 60 to obtain, according to the address information, data to be written corresponding to a first number, where address information corresponding to the first number is the same as the received address information and the first number is a number preceding the current time period number; and a writing module 604, configured to add a second number to the data to be written and address information corresponding to the first number and write the information to a cache.

For specific implementations of the modules in the program 832, reference may be made to corresponding modules in the embodiment illustrated in FIG. 6, which will not be further described herein.

It may be clearly understood by persons skilled in the art that, for the purpose of convenient and brief description, for a detailed working process of the foregoing device and module, reference may be made to a corresponding process in the foregoing method embodiments, and the details are not described herein again.

The following describes an application of the method provided by this embodiment of the present invention to a scenario that includes at least two disaster recovery centers.

Figure 9:
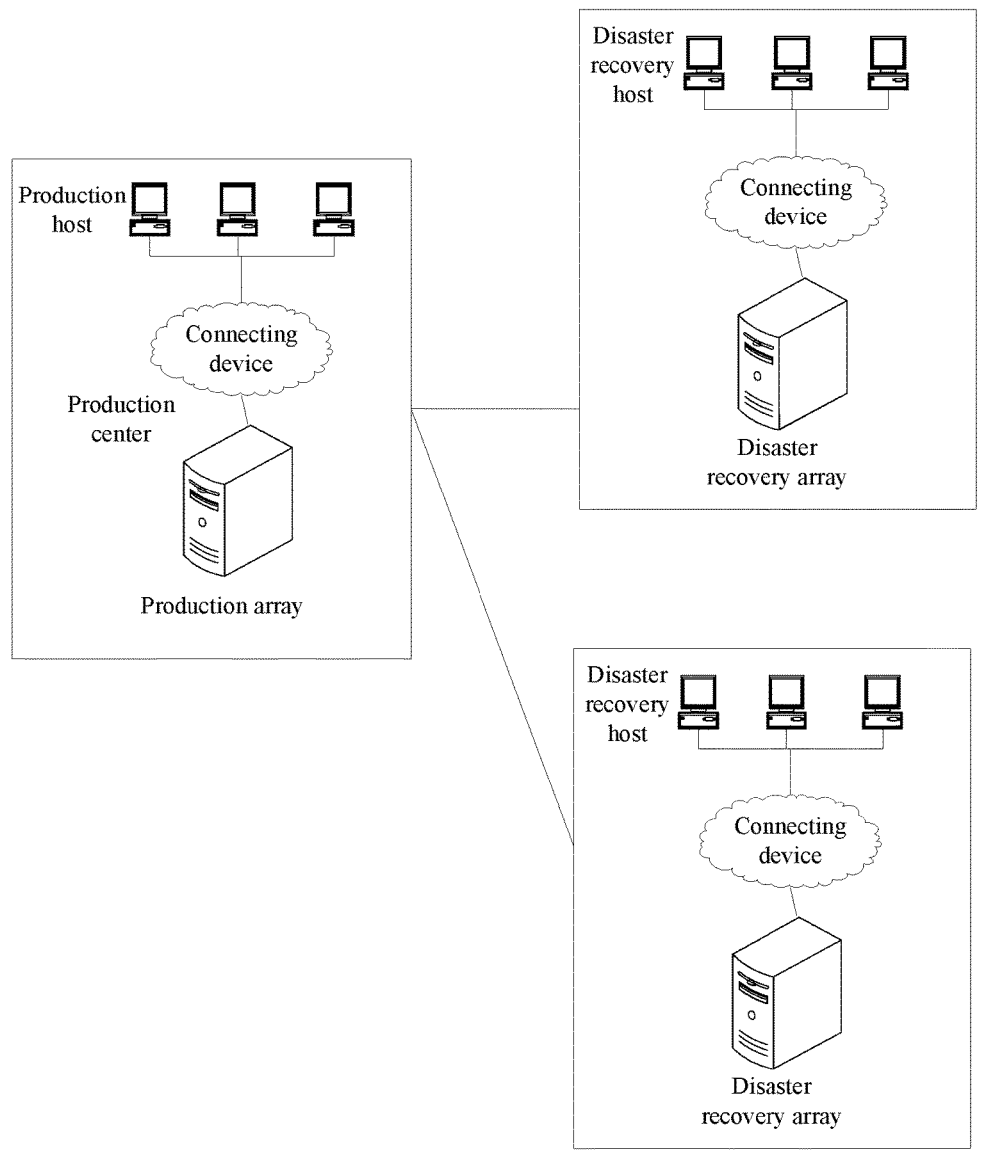
FIG. 9 is a schematic diagram of another application network architecture of a data sending method according to an embodiment of the present invention.

As shown in FIG. 9, a storage system includes one production center and at least two disaster recovery centers.

The production center includes a production host, a connecting device and a production array. A system architecture of a disaster recovery center is similar to that of the production center, including a disaster recovery host, a connecting device and a disaster recovery array. The production center and the disaster recovery center may perform data transmission over Internet Protocol (IP) or Fiber Channel (FC). There may be a control center between the production center and the disaster recovery center. The control center may be deployed on the production center side or on the disaster recovery center side, or deployed on a third-party device between the production center and the disaster recovery center. The control center is configured to send a signal to the disaster recovery array when the production array is faulty, so that the disaster recovery array takes over host services of the production array.

The production host and the disaster recovery host may be any computer devices known in the prior art, such as servers and desktop computers. Inside a host, an operating system and other application programs are installed.

The connecting device may include any interface, known in the prior art, between a storage device and a host, such as a fiber switch or other currently available switches.

The production array and the disaster recovery array may both be a storage device known in the prior art, such as a Redundant Array of Inexpensive Disks (RAID), Just a Bunch Of Disks (JBOD), and one or more interconnected disk drives, such as a tape library, or a tape storage device of one or more storage units, where the one or more interconnected disk drives are of a Direct Access Storage Device (DASD).

Storage space of the production array may include multiple data volumes. A data volume is logical storage space formed by mapping physical storage space. For example, a data volume may be a Logic Unit Number (LUN), or a file system. In this embodiment of the invention, the disaster recovery array has a structure similar to that of the production array.

To ensure security of data in the production center, generally, a plurality of disaster recovery centers needs to be deployed. The data in the production center is replicated to the plurality of disaster recovery centers, so that, when both the production center and one disaster recovery center encounters a disaster, another disaster recovery center still stores the data and the data is not lost. In this embodiment of the present invention, a task that the production array replicates data it stores in one data volume to a disaster recovery array is referred to as a replication relationship (also referred to as pair). Each replication relationship corresponds to one unique identifier (for example, ID). Before a disaster occurs, because the production array continuously receives write data requests sent by the host, the production array also needs to continuously replicate data it stores to the disaster recovery array. Therefore, one replication relationship may be divided to a certain number of time periods, and a task that the production array sends, within each period of time, information carried in a write data request received by one data volume, to the disaster recovery array is referred to as a replication task.

The production array may include a current time period number manager that stores current time period numbers. A current time period number may be a numeric value, such as 0, 1, or 2, or a letter, such as a, b, or c, which is not limited herein. It should be noted that the current time period number is applicable to every disaster recovery array. Every time when a replication task is triggered, the current time period number is modified.

That the current time period number is 1 is used as an example. When the production array receives a write data request, a number of a numeric value 1 is added to data to be written and address information carried in the write data request, and then the data to be written and address information carried in the write data request and the number of the numeric value 1 are all written to a cache.

When a replication task corresponding to a first disaster recovery array is triggered, the production array modifies the current time period number from a numeric value 1 to a numeric value 2, so that a number of the numeric 2 is added to data to be written and address information carried in a subsequently received write data request. Then, the data to be written and address information corresponding to the number of the numeric 1 are sent to the first disaster recovery array.

When a replication task corresponding to a second disaster recovery array is triggered, the production array modifies the current time period number from a numeric value 2 to a numeric value 3, so that a number of the numeric value 3 is added to data to be written and address information carried in a subsequently received write data request.

When a replication task corresponding to a third disaster recovery array is triggered, the production array modifies the current time period number from a numeric value 3 to a numeric value 4, so that a number of the numeric 4 is added to data to be written and address information carried in a subsequently received write data request.

However, when the replication task corresponding to the first disaster recovery array is triggered for another time, the production array modifies the current time period number from a numeric value 4 to a numeric value 5, so that a number of the numeric value 5 is added to data to be written and address information carried in a subsequently received write data request. It is assumed that the production array records only the current time period number. Then, at this time, accordingly, only the data to be written and address information corresponding to the number of the numeric value 4 are sent to the first disaster recovery center. Consequently, the data to be written and address information corresponding to the number of the numeric value 2 and the data to be written and address information corresponding to the number of the numeric value 3 are omitted, and data stored in the first disaster recovery array is inconsistent with that in the production array. Similarly, the second disaster recovery array and the third disaster recovery array is also faced with a problem that the received data to be written and address information are incomplete.

Figure 4:
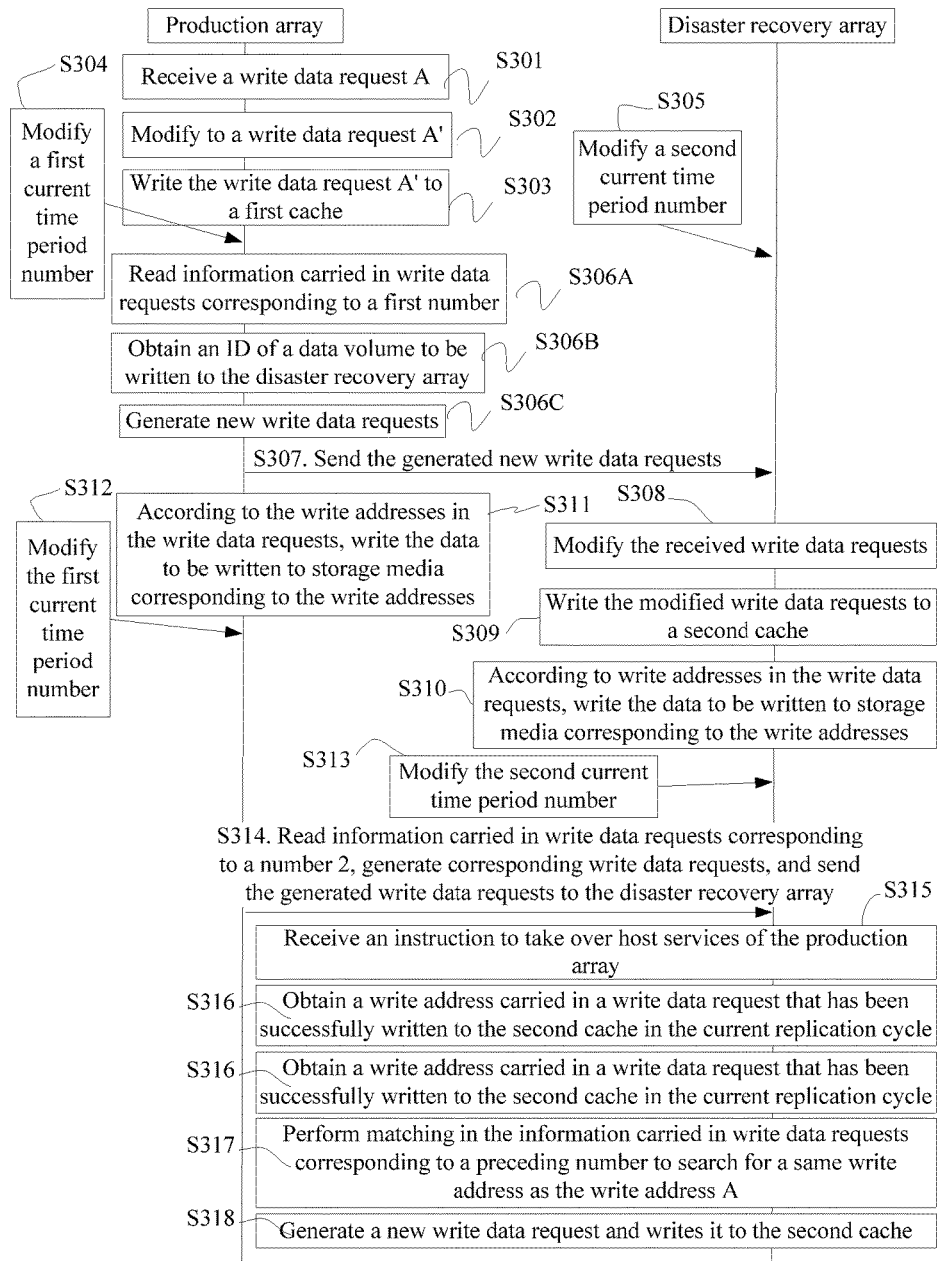
FIG. 4 is a signaling flowchart of a data sending method according to an embodiment of the present invention.
Figure 10:
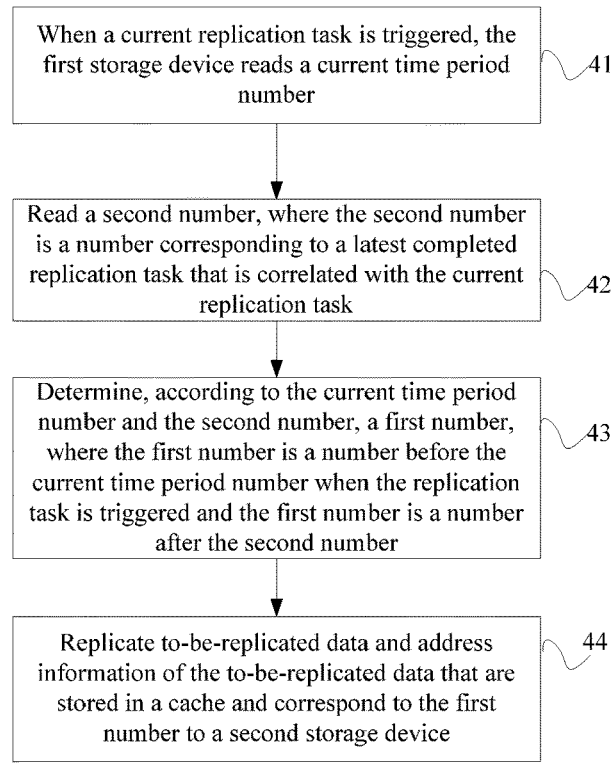
FIG. 10 is a flowchart of a data replication method according to an embodiment of the present invention.

Referring to FIG. 10, FIG. 10 shows an embodiment of a data replication method proposed by the present invention in order to solve the problem. The method is applied to a production array that corresponds to at least two disaster recovery arrays. In this embodiment of the present invention, for ease of description, the production array is referred to as a first storage device and one of the at least two disaster recovery arrays is referred to as a second storage device. It should be noted that reference may be made to the embodiments shown in FIG. 2 to FIG. 4 for specific execution of the following steps.

The method includes the following steps:

Step 41: When a current replication task is triggered, the first storage device reads a current time period number.

The replication task may be triggered by a timer, or triggered manually, or triggered in other triggering manners, which is not limited herein. When the replication task is triggered, the first storage device may read the current time period number from a current time period number manager. It should be noted that, when the replication task is triggered, the first storage device modifies the current time period number at a trigger moment, and here, the current time period number read by the first storage device is the modified current time period number. For ease of description, in the following steps, the current time period number before the modification is referred to as a historical time period number.

Step 42: Read a second number, where the second number is a number corresponding to a latest completed replication task that is correlated with the current replication task.

In this embodiment of the present invention, that the latest completed replication task is correlated with the current replication task means that the current replication task and the latest completed replication task belong to a same replication relationship, and from the preceding description, it can be learned that each replication relationship has a unique ID. When the replication task is triggered, the first storage device may receive the ID and read the second number according to the ID.

Specifically, when the current replication task is triggered by a timer, the ID may be carried in the timer; and when the current replication task is triggered manually, the first storage device may receive the ID in a signal form or other forms.

In this embodiment of the present invention, every time when a replication task is completed, a number corresponding to the completed replication task is recorded. Optionally, only a number corresponding to the latest completed replication task may be stored, and the number is updated when a next replication task is completed; or, numbers corresponding to all completed replication tasks may be stored, which is not limited herein.

It is understandable that a number corresponding to a latest completed replication task is recorded in each replication relationship.

Step 43: Determine, according to the current time period number and the second number, a first number, where the first number is a number before the current time period number when the replication task is triggered and the first number is a number after the second number.

For example, the current time period number is a numeric value 5 and the second number is a numeric value 2, and any number in an interval (2, 5) may be determined as the first number. It should be noted that the interval is an open interval excluding the numeric value 2 and the numeric value 5.

Step 44: Replicate to-be-replicated data and address information of the to-be-replicated data that are stored in a cache and correspond to the first number to a second storage device.

Specifically, the to-be-replicated data and the address information of the to-be-replicated data that correspond to the first number are read from the cache and the to-be-replicated data and the address information of the to-be-replicated data are sent to the second storage device.

Optionally, the first storage device may directly send the to-be-replicated data and the address information of the to-be-replicated data to the second storage device, or generate a write data request according to the to-be-replicated data and the address information of the to-be-replicated data and send the write data request to the second storage device.

Optionally, when a plurality of numbers all satisfies a condition of being before the current time period number when the current replication task is triggered and after the number corresponding to the latest completed replication task, and the plurality of numbers corresponds to same address information, only address information and to-be-replicated data corresponding to a latest number may be sent to the second storage device. The latest number is a number generated most recently. For example, it is assumed that the current time period number is modified by adding 1 each time, and the latest number is a number with a greatest numeric value.

In this embodiment of the present invention, when the current replication task is triggered, the first storage device determines the first number according to the current time period number and the second number, where the second number is a number corresponding to the latest completed replication task before the current replication task, and the first number is a number before the current time period number when the current replication task is triggered and after the second number, and replicates the to-be-replicated data and the address information of the to-be-replicated data that are stored in the cache and correspond to the first number to the second storage device. Because all numbers between the second number and the current time period number may be determined as the first number, as long as a number is determined as the first number, to-be-replicated data and address information of the to-be-replicated data that correspond to the number can be replicated to the second storage device. Therefore, even if the current time period number is modified when a replication task corresponding to another disaster recovery array is triggered, the first storage device can still find, according to the second number, to-be-replicated data and address information of the to-be-replicated data that are not replicated to the second storage device, and replicate them to the second storage device, thereby ensuring integrity of replication.

Optionally, in the foregoing embodiment, before the current replication task is triggered, the method further includes:

receiving a first write data request, where the first write data request includes the to-be-replicated data and the address information of the to-be-replicated data; and adding the first number to the to-be-replicated data and the address information of the to-be-replicated data and writing them to the cache, where the first number is a historical time period number.

Specifically, the historical time period number refers to a current time period number corresponding to a moment when the first write data request is received. From the embodiments shown in FIG. 2 to FIG. 4, it can be learned that, when a replication task is triggered, the historical time period number needs to be modified to a current time period number.

Optionally, the method may further include:

receiving a second write data request, where the second write data request includes target data and address information of the target data;

adding a third number to the target data and the address information of the target data;

determining whether the third number is the same as the first number;

when the third number is the same as the first number, determining whether the address information of the target data is the same as the address information of the to-be-replicated data;

when the address information of the target data is the same as the address information of the to-be-replicated data, replacing the to-be-replicated data stored in the cache with the target data; and when the address information of the target data is not the same as the address information of the to-be-replicated data, writing, to the cache, the target data and the address information of the target data after the third number is added.

When the third number is not the same as the first number, the target data and the address information of the target data after the third number is added are written to the cache.

Figure 11:
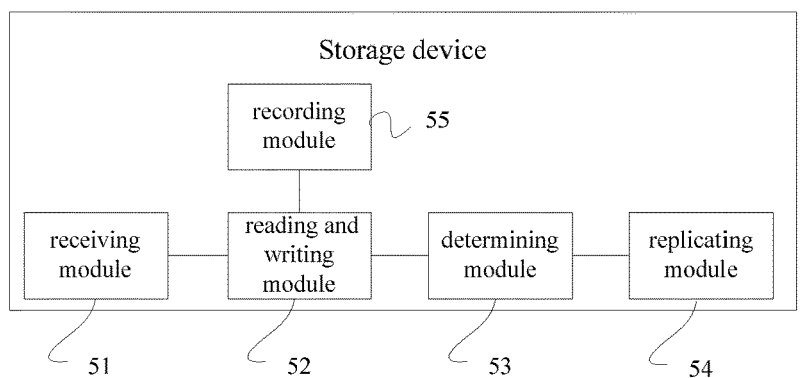
FIG. 11 is a schematic structural diagram of another storage device according to an embodiment of the present invention.

Referring to FIG. 11, FIG. 11 is a schematic structural diagram of a storage device according to an embodiment of the present invention. As shown in FIG. 11, the storage device includes: a reading and writing module 52, a determining module 53, and a replicating module 54.

The reading and writing module 52 is configured to read a current time period number when a current replication task is triggered, and read a second number, where the second number is a number corresponding to a latest completed replication task that is correlated with the current replication task.

The determining module 53 is configured to determine, according to the current time period number and the second number, a first number, where the first number is a number before the current time period number when the current replication task is triggered and the first number is a number after the second number.

The replicating module 54 is configured to replicate to-be-replicated data and address information of the to-be-replicated data that are stored in cache and correspond to the first number to a second storage device.

In this embodiment of the present invention, when the current replication task is triggered, the first storage device determines the first number according to the current time period number and the second number, where the second number is a number corresponding to the latest completed replication task before the current replication task, the first number is a number before the current time period number when the current replication task is triggered and after the second number, and replicates the to-be-replicated data and the address information of the to-be-replicated data that are stored in the cache and correspond to the first number to the second storage device. Because all numbers between the second number and the current time period number may be determined as the first number, as long as a number is determined as the first number, to-be-replicated data and address information of the to-be-replicated data that correspond to the number can be replicated to the second storage device. Therefore, even if the current time period number is modified when a replication task corresponding to another disaster recovery array is triggered, the first storage device can still find, according to the second number, to-be-replicated data and address information of the to-be-replicated data that are not replicated to the second storage device, and replicate them to the second storage device, thereby ensuring integrity of replication.

Optionally, the storage device may further include a recording module 55, configured to record the second number.

Optionally, that the latest completed replication task is correlated with the current replication task means that the current replication task and the latest completed replication task belong to a same replication relationship; and the storage device further includes a receiving module 51.

The receiving module 51 is configured to receive an identifier corresponding to the replication relationship.

The reading and writing module is specifically configured to read, according to the identifier, the second number corresponding to the current replication task.

Optionally, the receiving module 51 is further configured to receive a first write data request before the current replication task is triggered, where the first write data request includes the to-be-replicated data and the address information of the to-be-replicated data; and the reading and writing module 52 is further configured to add the first number to the to-be-replicated data and the address information of the to-be-replicated data, and write them to the cache, where the first number is a historical time period number. The current time period number is formed by modifying the historical time period number.

Optionally, the replicating module 54 is specifically configured to: when the address information corresponds to a plurality of numbers, determine a latest number in the numbers corresponding to the address information as the first number; and replicate the to-be-replicated data and the address information of the to-be-replicated data that are stored in the cache and correspond to the first number to the second storage device.

The storage device provided by this embodiment of the present invention is used to execute the data replication method described in the foregoing embodiment. Reference may be made to the description of the method embodiment for a detailed description of the functions of the modules, and no more details are described herein.

Figure 12:
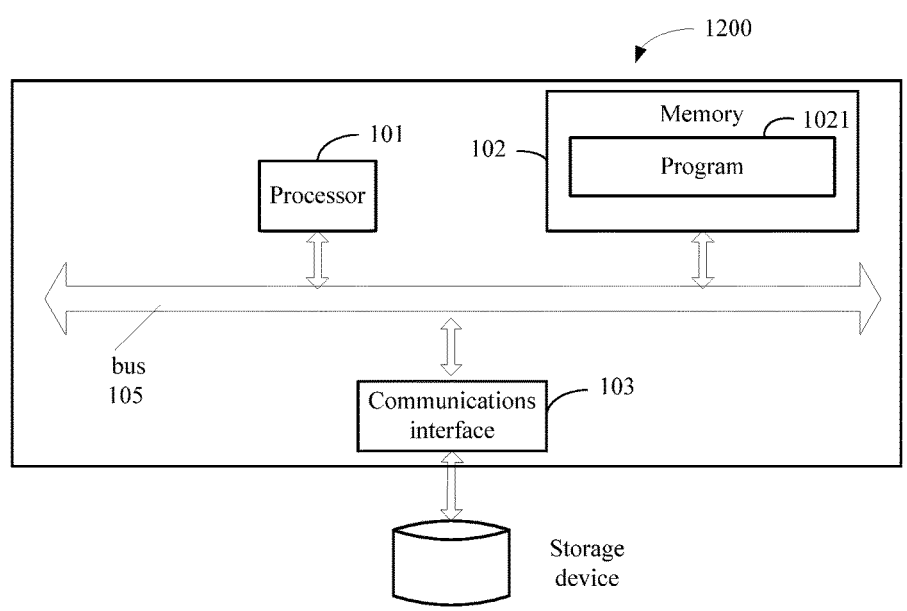
FIG. 12 is a schematic structural diagram of still another storage device according to an embodiment of the present invention.

As shown in FIG. 12, FIG. 12 shows a storage device provided by an embodiment of the prevent invention, including:

a processor 101, a memory 102, a system bus (bus for short) 105, and a communications interface 103. The processor 101, the memory 102, and the communications interface 103 are connected and implement mutual communication by using the system bus 105.

The processor 101 may be a single-core or multi-core central processing unit, or a specific integrated circuit, or be configured to one or more integrated circuits that implement the embodiments of the present invention.

The memory 102 may be a high-speed RAM memory, or a non-volatile memory (non-volatile memory), for example, at least one magnetic disk memory.

The communications interface 103 is configured to communicate with a storage device.

The memory 102 is configured to store a computer executable instruction 1021. Specifically, the computer executable instruction 1021 may include program code.

When a computer runs, the processor 101 runs the computer executable instruction 1021 and can execute the method process illustrated in FIG. 10.

In the several embodiments provided in the present application, it should be understood that the disclosed device and method may be implemented in other manners. For example, the described apparatus embodiment is merely exemplary. For example, the module division is merely logical function division and may be other divisions in actual implementation. For example, a plurality of modules or components may be combined or integrated into another device, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and the parts displayed as modules may or may not be physical sub-modules, may be located in one position, or may be distributed on a plurality of network sub-modules. Some or all of the modules may be selected to achieve the objectives of the solution of the embodiment according to actual needs.

In addition, function modules in the embodiments of the present invention may be integrated into a processing module, or each of the modules may exist alone physically, or two or more modules may be integrated into one module.

Persons of ordinary skill in the art may understand that all or a part of the steps of the foregoing embodiments may be implemented by hardware, or may be implemented by a program instructing relevant hardware. The program may be stored in a computer readable storage medium. The storage medium may be a read-only memory, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

We claim:

1. A method for a source storage device to send data to a backup storage device, comprising:
    receiving, by a processor of the source storage device, multiple write data requests;
    attaching, by the processor of the source storage device, a respective period ID to each of the multiple write data requests, each of the multiple write data requests including data, a period ID corresponding to a time period in which the write data request was received by the source storage device, wherein a current period ID corresponds to a current time period;
    writing, by the processor of the source storage device, the multiple write data requests attached with respective period IDs into a cache of the source storage device;
    in response to a trigger of a backup task corresponding to the current time period, identifying, by the processor of the source storage device, a historical period ID corresponding to a historical time period prior to the current time period, wherein data of write data requests received by the source storage device up to the historical time period have been duplicated to the backup storage device;
    retrieving, by the processor of the source storage device, data to be duplicated from the cache according to the current period ID and the historical period ID, the data to be duplicated having been written according to one of the write data requests, the one of the write data requests received subsequent to the historical time period and prior to the current time period, wherein the data to be duplicated is stored in the cache with a period ID valued between the historical period ID and the current period ID; and
    sending, by the processor, the retrieved data to the backup storage device.

2. The method according to claim 1, further comprising:
    determining, by the processor, that the backup task corresponding to the current time period is triggered before sending the retrieved data to the backup storage device, wherein the triggering of the backup task moves the source device into a next time period.

3. The method according to claim 1, wherein each of the write data requests further includes an address, and the method further comprises:
    sending, by the processor, the address to the backup storage device to instruct the backup storage device to store the retrieved data into a storage space of the address.

4. A storage device for sending data to a backup storage device, comprising:
    a cache for storing data to be replicated; and
    a processor configured to:
    receive multiple write data requests;
    attach a respective period ID to each of the multiple write data requests, each of the multiple write data requests including data, a period ID corresponding to a time period in which the write data request was received by the source storage device, wherein a current period ID corresponds to a current time period;
    write the multiple write data requests attached with respective period IDs into the cache;
    in response to a trigger of a backup task corresponding to the current time period is triggered, identify a historical period ID corresponding to a historical time period prior to the current time period, wherein data of write data requests received by the source storage device up to the historical time period have been duplicated to the backup storage device;
    retrieve data to be duplicated from the cache according to the current period ID and the historical period ID, the data to be duplicated having been written according to one of the write data requests, the one of the write data request received subsequent to the historical time period and prior to the current time period, wherein the data to be duplicated is stored in the cache with a period ID valued between the historical period ID and the current period ID; and
    send the retrieved data to the backup storage device.

5. The storage device according to claim 4, wherein the processor is further configured to determine that the backup task corresponding to the current time period is triggered before sending the retrieved data to the backup storage device, wherein the triggering of the backup task moves the storage device into a next time period.

6. The storage device according to claim 4, wherein each of the write data requests further includes an address, and wherein the processor is further configured to send the address to the backup storage device to instruct the backup storage device to store the retrieved data into a storage space of the address.

\* \* \* \* \*